United States Patent
Ruml (10) Patent No.: US 7,966,336 B2
(45) Date of Patent: Jun. 21, 2011

(54) BOUNDED SUB-OPTIMAL PROBLEM SOLVING

(75) Inventor: Wheeler Ruml, Durham, NH (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 529 days.

(21) Appl. No.: 11/948,265

(22) Filed: Nov. 30, 2007

(65) Prior Publication Data

US 2009/0144310 A1 Jun. 4, 2009

(51) Int. Cl.
*G06F 7/00* (2006.01)

(52) U.S. Cl. ........................................ 707/752

(58) Field of Classification Search .................. 707/705, 707/752
See application file for complete search history.

(56) References Cited

U.S. PATENT DOCUMENTS

| | | | |
|---|---|---|---|
| 5,646,740 A * | 7/1997 | Webster et al. ............... | 358/296 |
| 6,959,165 B2 | 10/2005 | Mandel et al. | |
| 6,973,286 B2 | 12/2005 | Mandel et al. | |
| 2006/0031802 A1 | 2/2006 | Alpert et al. | |
| 2006/0132815 A1 | 6/2006 | Lofthus et al. | |
| 2006/0227350 A1 | 10/2006 | Crawford et al. | |
| 2006/0230201 A1 | 10/2006 | Fromherz et al. | |
| 2006/0230403 A1 | 10/2006 | Crawford et al. | |
| 2006/0235547 A1 | 10/2006 | Hindi et al. | |
| 2007/0091797 A1 * | 4/2007 | Ma et al. ....................... | 370/229 |

OTHER PUBLICATIONS

Khoong et al., Double-Ended Binomial Queues, Proceedings of the 4th International Symposium on Algorithms and Computations, vol. 762, pp. 128-137 (Published 1993).*

Dae-Wha Seo et al., "Directory-Based Cache Coherence Scheme using Number-Balanced Binary Tree" Microprocessing and Microprogramming, Elsevier Science Publishers, BV., Amsterdam, NL, vol. 37, No. 1 / 05, Jan. 1, 1993, pp. 37-40, XP000329239, ISSN: 0165-6074.
Rohan Jude Fernandes, "Succint balanced binary tree and packed memory structure" Project Report for CS514, Design and Analysis of Data Structures and Algorithms II, XX, XX, Jan. 1, 2003, pp. 1-8, XP002466441.
European Search Report, Date mailed May 8, 2009 (7 pgs.).
U.S. Appl. No. 11/122,420, filed May 5, 2005, Richards.
U.S. Appl. No. 11/378,046, filed Mar. 17, 2006, Rizzolo et al.
U.S. Appl. No. 11/378,040, filed Mar. 17, 2006, German.
U.S. Appl. No. 10/924,458, filed Aug. 23, 2004, Lofthus et al.
U.S. Appl. No. 11/136,959, filed May 25, 2005, German et al.
U.S. Appl. No. 11/137,634, filed May 25, 2005, Lofthus et al.
U.S. Appl. No. 11/137,251, filed May 25, 2005, Lofthus et al.
U.S. Appl. No. 11/152,275, filed Jun. 14, 2005, Roof et al.

(Continued)

*Primary Examiner* — Greta L Robinson
*Assistant Examiner* — Jensen Hu
(74) *Attorney, Agent, or Firm* — Fay Sharpe LLP (57) ABSTRACT

A data structure is described that comprises a balanced binary tree and a binary heap, which may be utilized for combinatorial searching algorithms. For instance, solutions for performing a task, such as a print job or the like, are associated with nodes that are utilized to generate the data structure. Each node is associated with a quality indicator that describes a most optimal solution that may be reached through the node when traversing the binary tree. The binary heap is generated from a subset of the nodes in the tree, wherein each node in the subset has a quality indicator value that is within a predefined range of a best known solution quality. The binary heap is sorted according to a search effort indicator value for each node, where nodes that are more easily reached in the tree are placed higher in the heap to facilitate rapid identification.

16 Claims, 7 Drawing Sheets

OTHER PUBLICATIONS

U.S. Appl. No. 11/156,778, filed Jun. 20, 2005, Swift.
U.S. Appl. No. 11/157,598, filed Jun. 21, 2005, Frankel.
U.S. Appl. No. 11/170,845, filed Jun. 30, 2005, Sampath et al.
U.S. Appl. No. 11/359,065, filed Feb. 22, 2005, Banton.
U.S. Appl. No. 11/364,685, filed Feb. 28, 2006, Hindi et al.

* cited by examiner

BOUNDED SUB-OPTIMAL PROBLEM SOLVING

CROSS REFERENCE TO RELATED PATENTS AND APPLICATIONS

The following patents/applications, the disclosures of each being totally incorporated herein by reference are mentioned:

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. Publication No. US-2006-0132815-A1, Published Jun. 22, 2006, entitled "PRINTING SYSTEMS," by Robert M. Lofthus, et al.;

U.S. Publication No. US-2006-0227350-A1, Published Oct. 12, 2006, entitled "SYNCHRONIZATION IN A DISTRIBUTED SYSTEM," by Lara S. Crawford, et al.;

U.S. Publication No. US-2006-0230403-A1, Published Oct. 12, 2006, entitled "COORDINATION IN A DISTRIBUTED SYSTEM," by Lara S. Crawford, et al.;

U.S. Publication No. US-2006-0230201-A1, Published Oct. 12, 2006, entitled "COMMUNICATION IN A DISTRIBUTED SYSTEM," by Markus P. J. Fromherz, et al.;

U.S. Publication No. US-2006-0235547-A1, published Oct. 19, 2006, entitled "ON-THE-FLY STATE SYNCHRONIZATION IN A DISTRIBUTED SYSTEM," by Haitham A. Hindi;

U.S. application Ser. No. 11/122,420, filed May 5, 2005, entitled "PRINTING SYSTEM AND SCHEDULING METHOD," by Austin L. Richards;

U.S. application Ser. No. 11/136,959, filed May 25, 2005, entitled "PRINTING SYSTEMS," by Kristine A. German, et al.;

U.S. application Ser. No. 11/137,634, filed May 25, 2005, entitled "PRINTING SYSTEM," by Robert M. Lofthus, et al.;

U.S. application Ser. No. 11/137,251, filed May 25, 2005, entitled "SCHEDULING SYSTEM," by Robert M. Lofthus, et al.;

U.S. application Ser. No. 11/152,275, filed Jun. 14, 2005, entitled "WARM-UP OF MULTIPLE INTEGRATED MARKING ENGINES," by Bryan J. Roof, et al.;

U.S. application Ser. No. 11/156,778, filed Jun. 20, 2005, entitled "PRINTING PLATFORM," by Joseph A. Swift;

U.S. application Ser. No. 11/157,598, filed Jun. 21, 2005, entitled "METHOD OF ORDERING JOB QUEUE OF MARKING SYSTEMS," by Neil A. Frankel;

U.S. application Ser. No. 11/170,845, filed Jun. 30, 2005, entitled "HIGH AVAILABILITY PRINTING SYSTEMS," by Meera Sampath, et al.;

U.S. application Ser. No. 11/359,065, filed Feb. 22, 2005, entitled "MULTI-MARKING ENGINE PRINTING PLATFORM", by Martin E. Banton;

U.S. application Ser. No. 11/364,685, filed Feb. 28, 2006, entitled "SYSTEM AND METHOD FOR MANUFACTURING SYSTEM DESIGN AND SHOP SCHEDULING USING NETWORK FLOW MODELING", by Hindi, et al.;

U.S. application Ser. No. 11/378,046, filed Mar. 17, 2006, entitled "PAGE SCHEDULING FOR PRINTING ARCHITECTURES", by Charles D. Rizzolo, et al.;

U.S. application Ser. No. 11/378,040, filed Mar. 17, 2006, entitled "FAULT ISOLATION OF VISIBLE DEFECTS WITH MANUAL MODULE SHUTDOWN OPTIONS", by Kristine A. German, et al.

BACKGROUND

In machine control system design, it is important to utilize resources to their maximum capacities in order to optimize system throughput and/or minimize cost associated with such optimization. In the case of printers, photocopiers, and the like, conventional control mechanisms are limited in the manner in which they process information, perform jobs or tasks, plan such jobs or tasks, etc. For instance, where multiple tasks are to be performed for a job, a specific ordering of tasks may be preferable to the exclusion of one or more other orderings, and such a solution may be considered optimal for execution by a machine. In the case of a print platform, for example, an optimal ordering of pages to be printed, print associated tasks, or the like can be desirable in order to mitigate resource waste and improve printer throughput.

Conventional systems and methods for planning employ various search algorithms, including an A* search algorithm, which typically operates to facilitate finding a path from a given starting state to a desired goal state. An A* search algorithm is an example of a "best-first" search algorithm because it utilizes a heuristic estimate to rank a given node according to an estimate of an optimal route passing through the node to the desired node. The search algorithm may then determine an order in which to evaluate nodes according to their respective estimated values. However, A* algorithms explore all nodes that cannot be proven to be worse than the optimal, which can be time consuming and computationally expensive. This in turn can occupy resources (e.g., memory, processing power, etc.) and lead to processing delays. Accordingly, an unmet need exists in the art for systems and/or methods that facilitate improved processing efficiency for search algorithms and associated data structures.

BRIEF DESCRIPTION

In accordance with various aspects described herein, systems and methods are described that relate to generating, maintaining, and searching a data structure comprising a balanced binary tree and a binary heap. For example, a method of storing and accessing data in a coordinated data structure comprises generating a balanced binary tree data structure comprising a set of nodes arranged in order of decreasing quality indicator values, and generating a binary heap data structure comprising a subset of the set of nodes arranged in order of increasing search effort indicator value associated with the subset of nodes.

According to another aspect, a system that facilitates identifying a solution for a print job comprises a data structure generator that generates a balanced binary tree data structure and a binary heap data structure, a solver that searches the balanced binary tree data structure and the binary heap data structure to identify an optimal solution, and a search queue in which the balanced binary tree data structure and the binary heap data structure are stored for evaluation.

Yet another aspect relates to a system comprising one or more components that execute instructions for performing a process, and a data structure generator that generates a data structure comprising a binary tree and a binary heap using a plurality of nodes representing respective actions for performing the process, wherein each node is associated with a quality indicator representative of the quality of a best solution under the node and a search effort indicator representative of an amount of search effort related to reaching the best solution under the node. The system further comprises a solver that searches the binary heap to identify an action within a predetermined quality range of a best known action and places the identified node in a search queue for evaluation, wherein the data structure generator removes the node associated with the selected action from the binary tree and the binary heap to update the data structure and the solver iteratively searches the binary heap to select a next optimal action upon each successive update of the data structure.

DETAILED DESCRIPTION

In accordance with various aspects described herein, a coordinated data structure comprising a balanced binary tree and a binary heap may be cross-correlated during execution of a combinatorial search algorithm to permit rapid identification of a feasible search result of bounded suboptimality. It is to be understood that features presented herein may comprise and/or be employed in a variety of environments, including but not limited to a computing system, an industrial control system, a manufacturing execution system, computer game opponent controller, biological sequence alignment system, logistics software, an electronic imaging environment, as well as a xerographic environment, whereby one or more xerographic components are utilized to perform a xerographic procedure or function. Although the subject concepts are described largely in conjunction with a print platform, such as a printer or a copier, it will be appreciated that such concepts may be employed in conjunction with numerous other technologies and/or search algorithms. According to other aspects, such methods may be employed in conjunction with gaming applications, routing and motion planning applications, etc. Indeed, the subject innovation may be employed in any and all applications where a best-first search protocol and related data structure are utilized.

Figure 1:
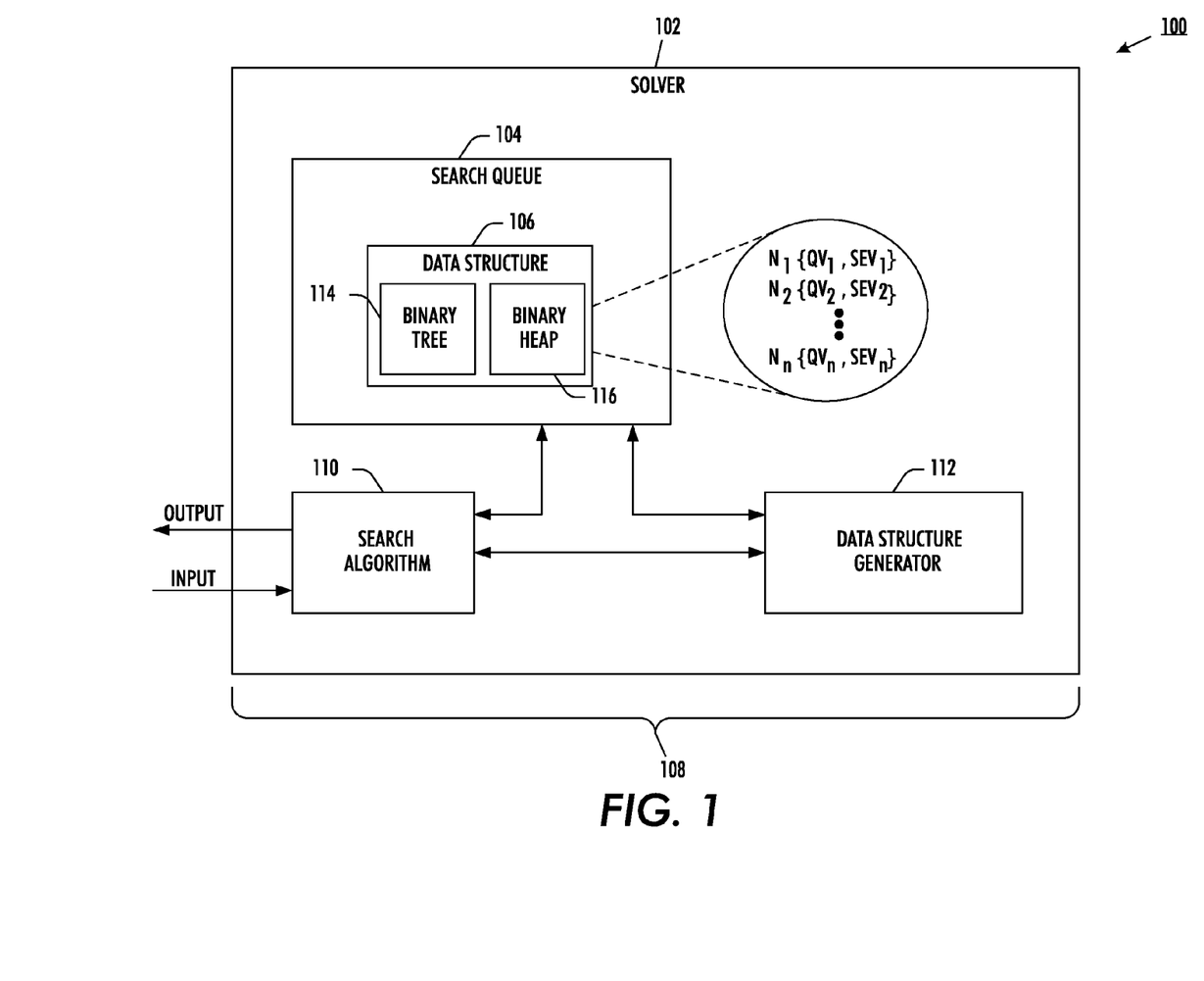
FIG. 1 a system is illustrated that facilitates generating a combined data structure comprising a binary tree and a binary heap.

With reference to FIG. 1, a system 100 is illustrated that facilitates performing a combinatorial search using a combined data structure comprising a binary tree and a binary heap. The system 100 comprises a solver 102 (e.g., a processor or the like) that may evaluate a plurality of nodes to determine an optimal solution possibility. For instance, each node (N) (e.g., representing a unique solution possibility) may have two values associated with it. For example, a quality indicator value (QV) describing a best solution under the node may be associated with the node, and a search effort indicator value (SEV) that indicates a level of effort required to reach the best solution under the node may additionally be associated with the node. A search queue 104 may comprise a data structure 106 that may be used by the solver 102. Nodes in the data structure 106 are depicted as $N_1$ through $N_n$, where n is an integer, and each is associated with its respective QV and SEV indicator values. It will be appreciated that the system 100 may be executed in and/or comprised by a computer 108.

In accordance with various aspects, the data structure 106 facilitates finding a node with a least amount of effort among a subset of all nodes comprising nodes within a predetermined quality factor of a best node (e.g., an optimal node for expansion when searching for a solution to a job request or the like). In this sense, an "optimal" node need not be the solution with the highest quality indicator value (although the optimal may have the highest quality indicator value of the set of all nodes), but rather may be a node with a "high-enough" quality indicator value (e.g., within a predetermined quality factor of the best solution) that is also associated with a minimum amount of search effort. Thus, the selected node may be somewhat "sub-optimal" in quality but may be selected over a more optimal node because it is easier to search among its descendants and find a feasible solution.

According to an example, each node may represent a unique action in a job plan solution for a machine, such as a printer or the like. Reaching a node representing the completion of the job would then correspond to having found a sequence of actions that accomplishes the job. This plan would be represented by a path along the nodes leading from the root node to the terminal node. The solver 102 may determine that it wants to evaluate all job plans within 5% efficiency of an optimal one. For instance, an optimal next node (N) may be given a unity quality value. The most easily reached node having at least 95% efficiency may then be removed from the binary tree 114 and the binary heap 116 of the data structure 106 and expanded (e.g., child nodes may be generated for the selected node), and the process may be reiterated. On a next pass, a next node meeting the predefined criteria may be selected, removed from the data structure 106, and expanded by the search algorithm 110 to facilitate generating complete solutions to a print job or the like. It will be appreciated that the foregoing example is not limited to an efficiency threshold of 95%, but rather may employ any suitable or desired efficiency threshold. Moreover, quality may be a function of one or more factors or parameters, including but not limited to: job processing time; job execution time; a number of actions involved in completing a given job solution; a number or quantity of resources involved in executing a given job solution; or any other suitable parameter that may result in a given job solution or action being preferred over another job solution or action. Search effort may be a function of many factors, such as the number of intervening nodes to a solution, the accuracy of heuristic quality estimates, or other factors.

The search queue 104 and its data structure 106 may comprise, for instance, the binary tree data structure 114, which may be a balanced binary tree according to some aspects, and the binary heap structure 116. The system 100 may additionally comprise a data structure generator 112 that receives input in the form of one or more jobs to be performed, one or more actions to be performed in association with the one or more jobs, or the like. The data structure generator 112 may then associate a plurality of job actions with respective nodes to form the data structure 106. For instance, the data structure generator 112 may execute a set of machine-executable instructions to generate a balanced binary tree comprising a plurality of nodes, each of which is associated with a particular job action. The data structure generator 112 may identify nodes in the balanced binary tree 114 that are within the predefined efficiency or relevance range of an optimal node, and may organize identified nodes into the binary heap 116 according to their respective levels of search difficulty. The data structure generator 112 may thus facilitate selection of nodes by the solver 102 (e.g., a most easily searched node in the binary heap 116 may be selected) for evaluation and expansion by the solver 102. Additionally, the data structure generator 112 may update the data structure 106 by removing a node from the binary tree 114 and/or the binary heap 116 upon selection of the node for expansion. Once the node has been expanded by the solver 102, the node and its children may be reinserted into the binary tree 114, and the binary tree and binary heap 116 may be updated to reflect any changes that are caused by the new nodes. In this manner, the system 100 may effectively reduce a total expanded solution space that is explored by the solver 102 to identify and evaluate an optimal solution.

Figure 2:
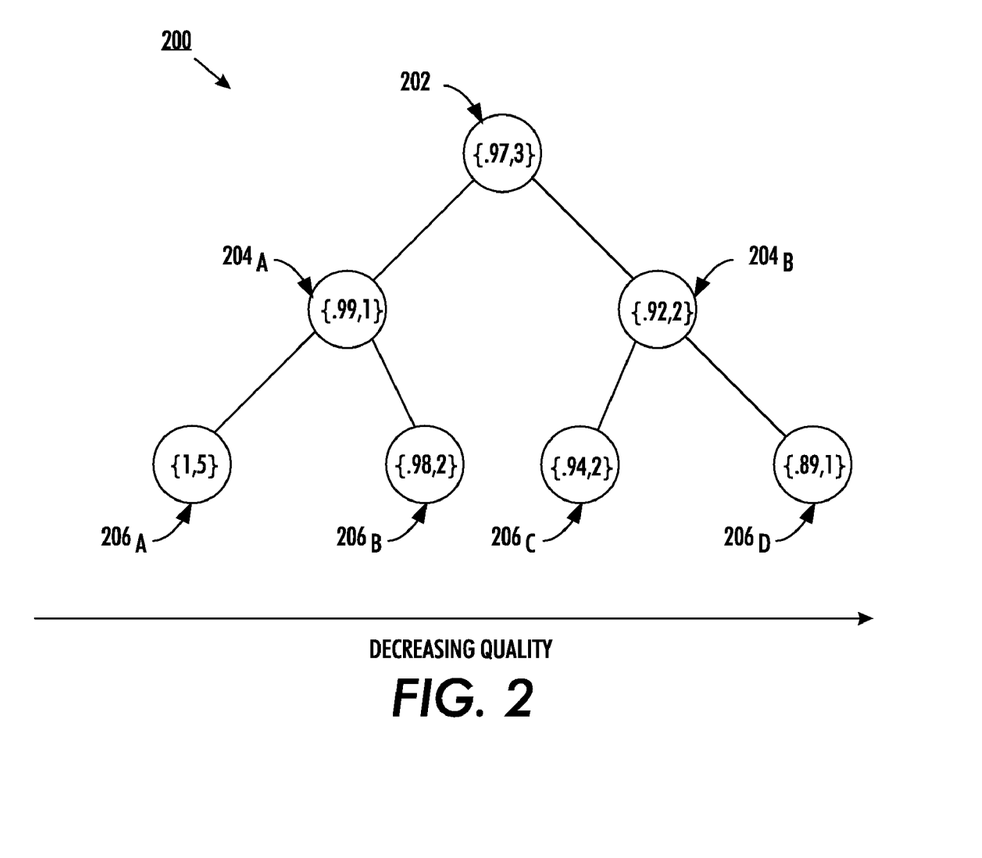
FIG. 2 is an illustration of a balanced binary tree such as may be employed as a part of a data structure to facilitate identifying and evaluating an optimal next action in a job solution among a plurality of possible next actions, in accordance with various features.

FIG. 2 is an illustration of a balanced binary tree 200 such as may be employed as a part of a data structure to facilitate identifying appropriate nodes among a plurality of possible nodes, in accordance with various features. The binary tree 200 comprises a parent node, 202, which has a pair of child nodes, $204_A$ and $204_B$, each of which in turn has a pair of child nodes. For example, the children of $204_A$ are labeled $206_A$ and $206_B$, respectively, and the children of $204_B$ are labeled $206_C$ and $206_D$, respectively. Each node in the tree 200 is associated with an action that may be performed by a machine, such as a printer or the like, as a solution to a job request. The binary tree 200 may be organized in order of decreasing quality, from left to right, although other organizations will be apparent to those of skill. Each node is associated with a quality indicator value and a search effort indicator value {QV, SEV} that indicates the node's relevance as a next logical action in a potential solution to a print job and a level of difficulty associated with searching the node, respectively.

Each node in the binary tree 200 may comprise a pointer to its parent, to its left child, and to its right child. The binary tree 200 represents a first portion of a data structure, such as tree 114, which is part of the data structure 106 described with regard to FIG. 1, in which data may be organized. Additionally, the binary tree 200 may be employed in conjunction with a binary heap, described below, as a pair of coordinated data structures that facilitate reducing time to access appropriate nodes to be explored by the search algorithm 110. It will be understood that the binary tree 200 may comprise any number of nodes, which correspond to a like number of potential solutions, and is not limited to a tree size of 7 nodes as illustrated.

Figure 3:
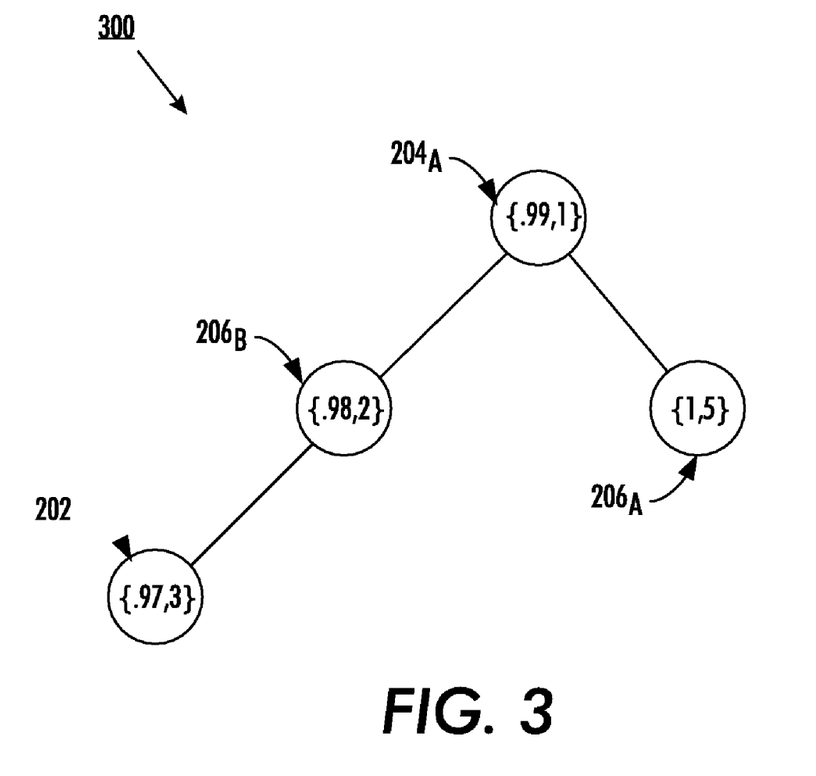
FIG. 3 is an illustration of a binary heap that may be utilized in conjunction with a binary tree to facilitate storing data in coordinated data structures for rapid evaluation of a next optimal node for expansion in a search tree, in accordance with one or more aspects.

FIG. 3 is an illustration of a binary heap 300 that may be utilized in conjunction with a binary tree to facilitate storing data in coordinated data structures for rapid combinatorial searching, in accordance with one or more aspects. A binary heap is a data structure that may be created using a binary tree, such as the binary tree of FIG. 2. It will be apparent to those skilled in the art that a binary heap can be implemented using an underlying array data structure to facilitate quick access to various elements of the heap. According to an example, the binary heap 300 may be a min-heap where in each node is associated with less search effort than its child nodes. A node may be added to the bottom of the heap, and then compared to its parent; if the node's position in the binary tree 200 is less difficult to reach than its parent node's position in the binary tree 200, then the node may be swapped with its parent in the binary heap 300. This may be iterated until the binary heap 300 has a correct ordering.

It will be appreciated that the binary heap 300 need not include all nodes of the binary tree 200 described above. However, each node in the binary heap 300 may be a node selected from binary tree 200. According to an example, a search may be performed for all nodes having a solution value that is within 10% of an optimal solution value. For instance, if a best solution for a given job sequence takes 15 seconds for execution, and if time is a criterion upon which solutions are evaluated, then nodes associated with actions that are likely to result in solutions that do not take longer than 16.5 seconds to complete may be selected for inclusion in the binary heap 300.

When organizing the binary heap 300, a criterion for node dependency may comprise ease of search. For example, if a search of the binary tree 200 for nodes within 5% of an optimal next action is performed, a total of 4 nodes will be returned (e.g., nodes 202, $204_A$, $206_A$, and $206_B$), and these nodes may be utilized to generate the binary heap 300. Thus node $206_B$ is shown at the top of the binary heap 300 because its SEV is 1, indicating a lowest relative level of search difficulty. Node 206B is further down in the binary heap 300 because it has a higher search effort associated with it.

Accordingly, when a search is performed for a solution to a particular job or task, node $204_A$ may be selected and removed from the binary heap 300. Additionally, the corresponding node in the binary tree 200 (e.g., node $204_A$) may be removed because the node contains pointer information to its parent and children (in the binary tree 200) when stored in the binary heap 300. That is, node $204_A$ may comprise pointer information indicating that it is a child node of node 202 in the binary tree 200, as well as the identity of any child nodes it has in the binary tree 200. In this manner it may be easily located in the binary tree 200 and removed. The binary tree 200 may be updated for a subsequent evaluation, as may the binary heap 300.

It will be appreciated that the various thresholds and/or criterion described above with regard to the preceding examples are illustrative in nature, and that any suitable threshold(s) (e.g., 1%, 5%, 7%, 15%, 50%, etc.) and/or any suitable criteria (e.g., time, energy conservation or expenditure, resource conservation or expenditure, cost reduction, etc.) may be used.

Figure 4:
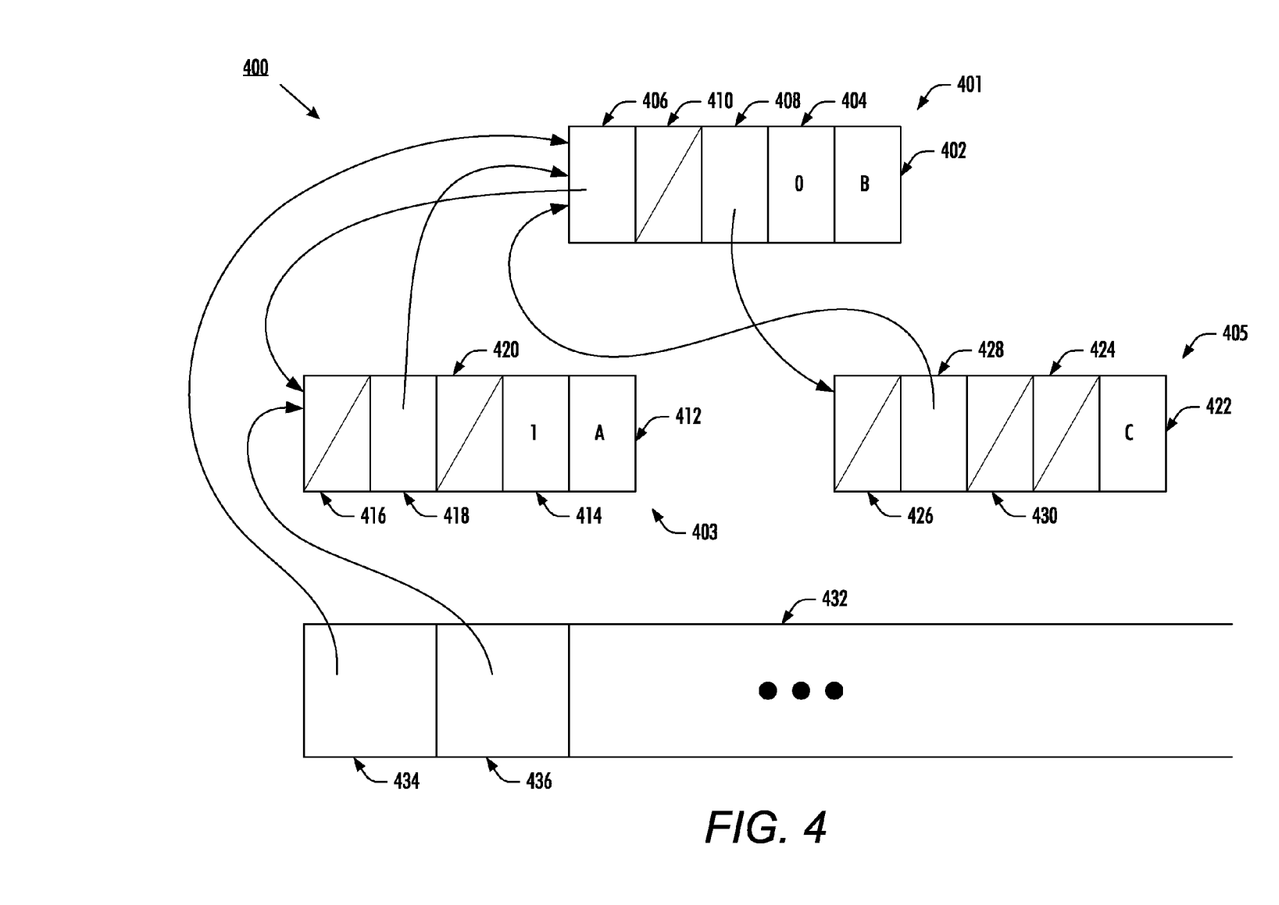
FIG. 4 illustrates a data structure that comprises a plurality of nodes that comprise a binary tree, and a portion of an array that may be implemented as a binary heap, in accordance with various aspects.

FIG. 4 illustrates a combined data structure comprising a binary tree portion and a binary heap portion, such as is described above. A plurality of nodes is depicted, and arrows in the figure correspond to active pointers from one node to another. A first node 401 has five pieces of information associated with it (e.g., in addition to the QV and SEV information described above). For instance, node 401 has a node data field 402 associated with it, wherein the node data comprises information related to the identity of the node, actions associated with the node (e.g., which may form part of a solution), and any other suitable information that may facilitate the various methods described herein. Additionally, node 401 has an array index value 404 that indicates its position in the array 432 (e.g., the binary heap). In this case, node 401 has an array pointer value of 0 because it is associated with a lowest amount of search effort and is thus first in the array, which is initiated at 0 (although such arrays may be initiated at 1 or some other suitable value, as is known). Node 401 also has three pointer fields: a pointer 406 to its left child node, a pointer 408 to its right child node, and a pointer 410 to its parent node. Since node 401 is the root node in the tree portion of the data structure 400, it has no parent, and therefore its parent pointer 410 is null, as indicated by the hash line through the null pointer.

Similarly, node 403 has a node data field 412, an array index or pointer 414, left and right child node pointers 416 and 420, respectively, and a parent pointer 418. In like fashion, Node 405 comprises a node data field 422, an array pointer 424, left and right child node pointers 426 and 430, respectively, and a parent pointer 428. In this simplified example, only three nodes are shown, and thus nodes 403 and 405 exhibit null child node pointers. However, it will be appreciated that the systems and methods presented in this document are not limited in the number of nodes that may be employed in the data structure(s) described herein. Additionally, it will be noted that node 405 has a null array pointer 430 because it is not included in the array, which is the result of node 405 not being selected for inclusion in the array. This occurrence is caused by node 405 having a quality indicator value that is outside a predetermined acceptable range for inclusion in the array 432, such as is described above with regard to preceding figures.

The binary heap array structure 432 comprises nodes arranged according to their respective search effort values. As depicted, a first position 434 holds a pointer to node 401 indicating that it is the most easily searched node in the array. Position 434 has a pointer to node 401 in order to permit rapid location of it in the binary tree portion of the data structure (e.g., at node 401). Similarly, location 436 has a pointer to a location in the tree portion, at node 412. In this manner, nodes may be rapidly removed from the data structure 400 for expansion when evaluating potential job solution paths.

Figure 5:
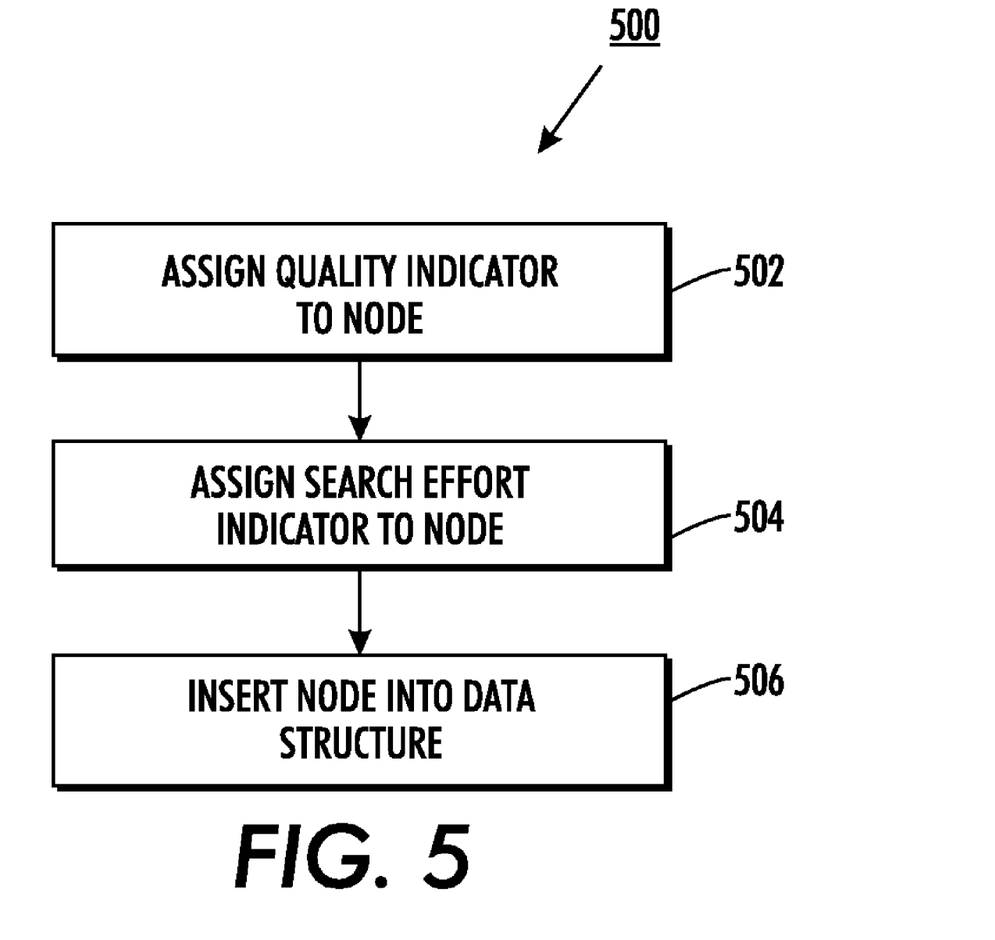
FIG. 5 is an illustration of a method for generating a coordinated data structure comprising a binary tree and a binary heap to facilitate combinatorial searching of a plurality of nodes, in accordance with one or more features described herein.
Figure 6:
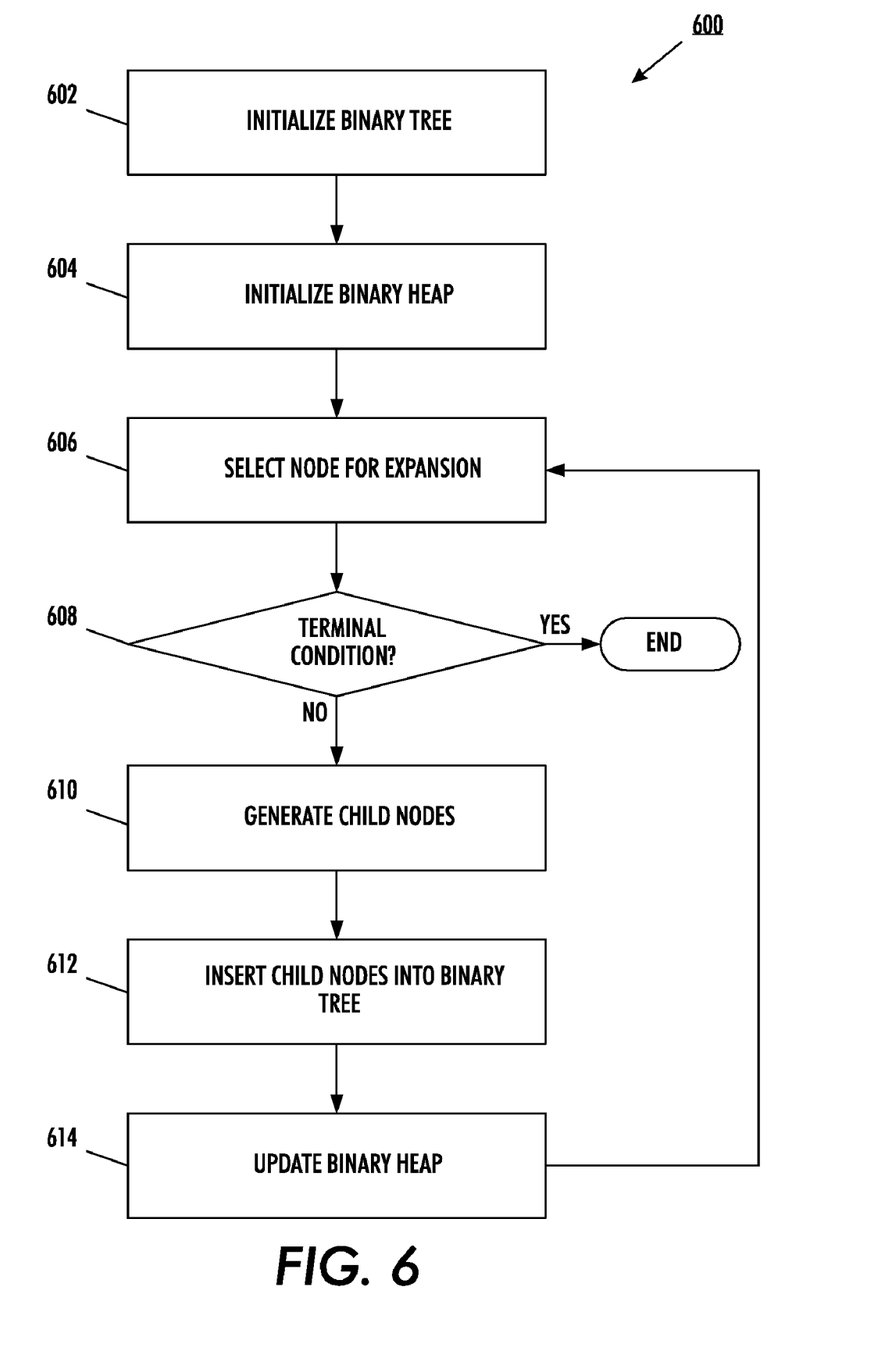
FIG. 6 is an illustration of a method for generating a data structure comprising both a balanced binary tree and a binary heap in order to optimize search time and optimal solution identification.

With regard to FIGS. 5-6, methods are described that facilitate generating and/or updating a data structure comprising both a balanced binary tree and a binary heap to facilitate combinatorial searching algorithm execution. The methods are represented as flow diagrams depicting a series of acts. However, it will be appreciated that, in accordance with various aspects of the described innovation, one or more acts may occur in an order different than the depicted order, as well as concurrently with one or more other acts. Moreover, it is to be understood that a given method may comprise fewer than all depicted acts, in accordance with some aspects.

FIG. 5 is an illustration of a method 500 for generating a coordinated data structure comprising a binary tree and a binary heap to facilitate combinatorial searching of a plurality of nodes, in accordance with one or more features described herein. According to the method, a quality indicator may be assigned to a node, wherein the quality indicator describes a quality of an action or plurality of actions associated with the node, at 502. For instance, in the context of a machine, such as a printer, the quality of a given action may be associated with the rapidity with which the action facilitates performance of a print job, a number of actions associated with job completion, a number or quantity of resources consumed in completing the action, or some other parameter associated with action and/or solution efficiency, etc.

At 504, a search effort indicator may be assigned to the node. For instance, the search effort indicator may estimate number of nodes in a path to a goal node, accuracy of evaluation information, or the like. At 506, the node may be inserted into a data structure, which may comprise a binary tree with nodes arranged according to their respective qualities, as well as a binary heap with nodes arranged according to their associated relative degrees of search effort.

FIG. 6 is an illustration of a method 600 for searching a data structure comprising both a balanced binary tree and a binary heap in order to identify and/or evaluate an optimal solution for a job request. At 602, the binary tree may be initialized. At 604, the binary heap (or array) may be initialized, where the binary heap is generated as a function of the binary tree. According to an example, the binary tree may be searched to identify all nodes within a predefined threshold range of a target value that is associated with an action to be performed in a job solution, or plan. For instance, if a target value is 100% efficiency, and the predefined threshold range is 30%, then all nodes associated with actions that are at least 70% as efficient as the best known next action may be identified in the tree and placed in the binary heap in order of their respective levels of search difficulty with lower search effort levels given priority in the heap. At 606, a node may be selected from the binary heap for expansion, whereby the node removed from the binary tree and the binary heap and is added to a search tree that delineates possible job solution routes.

At 608, a determination may be made regarding whether consideration of the selected node results in a terminal condition. For example, this may occur when the node's action results in the completion of the desired print job, etc (e.g., no further actions need be searched). If such is the case, then the node does not require expansion and the method may terminate. However, if a terminal condition is not detected, then at 610, child nodes may be generated for the selected node, where the generated child nodes represent elaborations or extensions of the parent's partial solution. At 612, the new child nodes may be inserted into the binary tree. Inserted child nodes may, for example, represent a single action or a plurality of actions associated with performing a print job or the like. The addition of the generated child nodes may change the structure of the binary tree with regard to relative quality indicator values and the like, and may thus result in an update of the binary tree. At 612, the binary heap or array may also be updated to account for changes in solution quality thresholds or search difficulty that may have arisen due to the insertion of the new nodes. The method may then revert to 606, where a subsequent node may be selected for expansion. In this manner, a vast number of potential actions may be searched, evaluated, and serialized in order to generate a viable solution to a job request, while mitigating time expenditure associated with evaluation of non-viable or too-distant solution paths.

Figure 7:
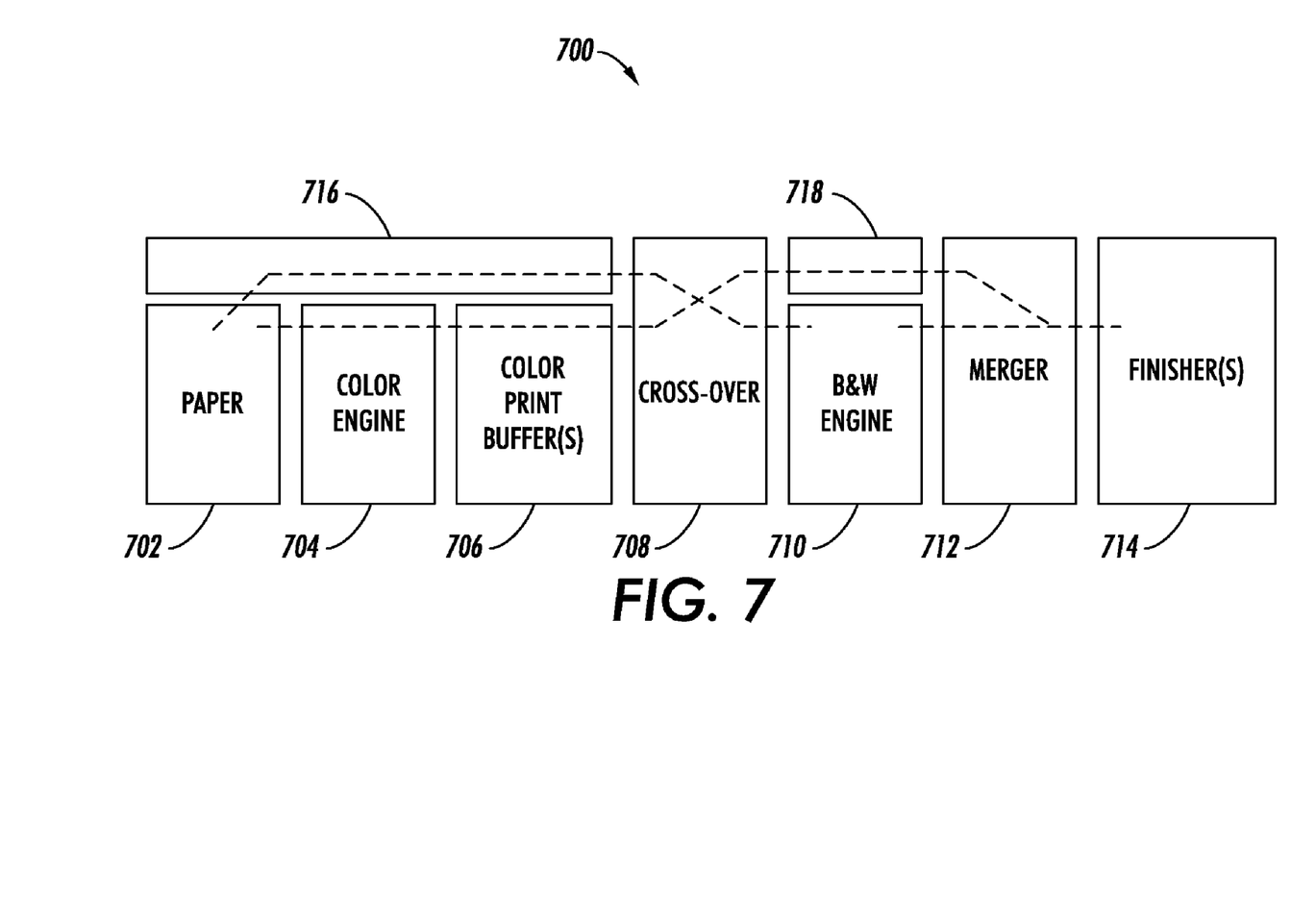
FIG. 7 illustrates a system that depicts a plurality of components, such as may be employed in conjunction with the various features described herein in a universal production printer with a color print sheet buffer, or a tightly-integrated parallel printing (TIPP) system.

FIG. 7 illustrates a system 700 comprising a plurality of components, such as may be employed in a universal production printer with a color print sheet buffer or a tightly-integrated parallel printer (TIPP) system, which represents an environment in which the various features described herein may be employed. The system 700 comprises a paper source 702, which may comprise one or more sheets of paper, and which is operatively associated with a color engine 704 and a crossover 708. Paper from the paper source 702 may follow one of two paths. For instance, paper may be routed from the paper source 702 to the color print engine 704, and on to a color print buffer 706, before entering the crossover 708. Additionally or alternatively, paper may be routed directly from the paper source 702 to the crossover 708 (e.g., bypassing the color engine 704 and the color print buffer 706).

Paper that has been routed directly from the paper source 702 to the crossover 708 may be passed to a black-and-white print engine 710, then through a merger 712 that merges black-and-white and color pages, before proceeding on to a finisher 714 that finishes the document for presentation to a user. Prior to insertion by crossover 708, paper may be stored temporarily in a sheet buffer 716. Paper that has been routed through the color print engine 704 and the color print buffer 706 may be passed through the crossover 708 into a sheet buffer 718 for temporary storage until such time as the color-printed page is merged by merger 712 with other black-and-white pages. It will be appreciated that according to other examples, a page may pass through all components of the system 700 and may have both color portions and black-and-white portions. The actions associated with a job performed by system 700 may be organized into a series of events that define one or more solutions to the job, which may be associated with respective nodes in the data structure(s) described above.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of storing and accessing data in a coordinated data structure, comprising:
   generating a balanced binary tree data structure comprising a set of nodes arranged in order of decreasing quality indicator values;
   generating a binary heap data structure comprising a subset of the set of nodes arranged in order of increasing search effort indicator value associated with the subset of nodes;
   defining a threshold minimum quality indicator value;
   identifying nodes in the set of nodes that have a quality indicator value equal to or greater than the threshold minimum quality indicator value;
   including the identified nodes in the subset of the set of nodes in the binary heap data structure; and
   identifying a node that has a quality indicator value that is equal to or greater than the threshold minimum quality indicator value, and that has a lowest associated search effort.

2. The method of claim 1, wherein the subset of nodes comprises all nodes in the set of nodes.

3. The method of claim 2, further comprising selecting a node from the subset of nodes in the binary heap data structure, removing the node from the binary heap data structure and the balanced binary tree data structure, and placing the node in a search queue for evaluation of a solution associated with the selected node.

4. The method of claim 3, wherein the quality indicator value is associated with at least one of solution efficiency, solution execution time, and solution resource consumption.

5. The method of claim 1, further comprising selecting the identified node for expansion.

6. The method of claim 5, further comprising removing the selected node from the binary tree data structure and the binary heap data structure and updating the data structures.

7. A system that facilitates identifying a solution for a print job, comprising:
   a data structure generator that generates a balanced binary tree data structure and a binary heap data structure;
   a solver processor that searches the balanced binary tree data structure and the binary heap data structure to identify a solution; and
   a search queue in which the balanced binary tree data structure and the binary heap data structure are stored for evaluation;
   wherein the balanced binary tree data structure comprises a plurality of nodes, each of which represents a print job action and comprises a quality indicator, wherein the plurality of nodes is arranged in order of decreasing quality indicator values;
   wherein the binary heap data structure comprises a subset of the plurality of nodes stored in the balanced binary tree, each of which comprises a search effort indicator and is sorted in order of increasing search effort associated with reaching a given node; and
   wherein the solver processor identifies a node that has a quality indicator value that is equal to or greater than a threshold minimum quality indicator value, and that has a lowest associated search effort.

8. The system of claim 7, wherein the quality indicator of a given node describes a quality of a most optimal solution under the node, the most optimal solution being a solution that has at least one of a highest efficiency, a shortest execution time, and a lowest resource consumption level, relative to other identified solutions.

9. The system of claim 7, wherein the data structure generator identifies nodes in the balanced binary tree data structure that are associated with actions that are within a predefined quality range of a best known action and generates the binary heap data structure using the identified nodes.

10. The system of claim 9, wherein the search algorithm searches the binary heap data structure and selects a node with a lowest search effort indicator value and places node in the search queue for expansion.

11. The system of claim 10, wherein the data structure generator removes the selected node from the balanced binary tree data structure and the binary heap data structure and updates the balanced binary tree data structure and the binary heap data structure to conform to changes that result from removal of the selected node.

12. The system of claim 11, wherein the solver processor searches the updated binary heap data structure, selects a next optimal action and places a node associated therewith into the search queue.

13. The system of claim 12, wherein the solver processor evaluates solutions in the search queue and selects an optimal solution as a function of the quality indicator value and search effort indicator value associated with the solution.

14. A system, comprising:
   one or more components that execute instructions for performing a process;
   a data structure generator that generates a data structure comprising a balanced binary tree and a binary heap using a plurality of nodes representing respective actions for performing the process, wherein each node in the balanced binary tree is associated with a quality indicator representative of the quality of a best solution under the node and each node in the binary heap is associated with a search effort indicator representative of an amount of search effort related to reaching the best solution under the node; and a solver processor that searches the binary heap to identify an action within a predetermined quality range of a best known action and places the identified node in a search queue for evaluation;

wherein the data structure generator removes the node associated with the selected action from the binary tree and the binary heap to update the data structure and the solver iteratively searches the binary heap to select a next optimal action upon each successive update of the data structure;

wherein the best solution is identified as a function of the quality indicator, which is associated with at least one of a level of solution efficiency relative to other solutions under the node, a shortest execution time relative to other solutions under the node, and a lowest resource consumption level relative to other solutions under the node; and wherein the solver processor identifies a node that has a quality indicator value that is equal to or greater than a threshold minimum quality indicator value, and that has a lowest associated search effort.

15. The system of claim 14, wherein the components are xerographic components for performing a xerographic process.

16. The system of claim 15, wherein the xerographic components are part of a tightly-integrated parallel printing platform.

* * * * *